(12) United States Patent
Jang et al.

(10) Patent No.: US 12,300,232 B2
(45) Date of Patent: May 13, 2025

(54) GUIDE ROBOT AND OPERATION METHOD THEREOF

(71) Applicant: LG ELECTRONICS INC., Seoul (KR)

(72) Inventors: Dongseon Jang, Seoul (KR); Jongo Choi, Seoul (KR); Soojin Lee, Seoul (KR); Hyeongjin Kim, Seoul (KR); Byungjoon Kim, Seoul (KR); Mihyun Park, Seoul (KR); Hyungjin Choi, Seoul (KR); Munho Yun, Seoul (KR); Junghyun Lee, Seoul (KR); Sunghyun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 301 days.

(21) Appl. No.: 17/940,763

(22) Filed: Sep. 8, 2022

(65) Prior Publication Data
US 2023/0197073 A1 Jun. 22, 2023

(30) Foreign Application Priority Data
Dec. 22, 2021 (KR) .................... 10-2021-0185221

(51) Int. Cl.
*G10L 15/22* (2006.01)
*B25J 9/00* (2006.01)
*B25J 11/00* (2006.01)

(52) U.S. Cl.
CPC ............ *G10L 15/22* (2013.01); *B25J 9/0003* (2013.01); *B25J 11/0015* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 10,898,999 B1* | 1/2021 | Cohen | B25J 9/0003 |
| 2007/0192910 A1* | 8/2007 | Vu | G05D 1/0246 |
| | | | 901/1 |
| 2018/0001474 A1* | 1/2018 | Sinyavskiy | B25J 9/1697 |
| 2020/0073401 A1* | 3/2020 | Szatmary | G05D 1/0257 |
| 2020/0122333 A1* | 4/2020 | Park | B25J 13/086 |
| 2021/0016431 A1* | 1/2021 | Kim | B25J 19/026 |

FOREIGN PATENT DOCUMENTS

| | | |
|---|---|---|
| KR | 10-2016-0064258 A | 6/2018 |
| KR | 10-2019-0085890 A | 7/2019 |
| WO | WO 2017/217978 A1 | 12/2017 |

\* cited by examiner

*Primary Examiner* — Quynh H Nguyen
(74) *Attorney, Agent, or Firm* — Birch, Stewart, Kolasch & Birch, LLP

(57) ABSTRACT

A guide robot can include a travel part to move the guide robot, a touch screen and a camera, a sensor to detect an approach of a user, and a voice reception part to receive a voice. The guide robot further includes a controller to display at least one digital signage while the guide robot is traveling, in response to detecting the approach of the user, stop the traveling of the guide robot and transition the camera from a deactivated state to an activated state, and detect a face and a face angle of the user. Also, in response to determining that the user intends to use the guide robot, the controller can trigger a voice conversation mode by activating the voice reception part, stopping the display of the at least one digital signage and outputting usage guide information for the voice conversation mode.

17 Claims, 13 Drawing Sheets

GUIDE ROBOT AND OPERATION METHOD THEREOF

CROSS-REFERENCE TO RELATED APPLICATION

Pursuant to 35 U.S.C. § 119(a), this application claims the benefit of the earlier filing date and the right of priority to Korean Patent Application No. 10-2021-0185221, filed in the Republic of Korea on Dec. 22, 2021, the entirety of which is incorporated by reference into the present application.

BACKGROUND

Technical Field

The present disclosure relates to a guide robot and a method for operating the same, and more particularly, to a guide robot capable of recognizing a user's intention to speak (talk) without using a wake-up word and a method for operating the same.

Discussion of the Related Art

Recently, interest in guide robots that provide various guide services to users has been steadily increasing, and in particular, support for a voice conversation (e.g., chat, talk, etc.) function is expanding even in guide robots, as in various devices.

When activating the voice conversation function, a voice misrecognition problem may occur due to noise and unintentional voice, so a method of activating (triggering) the voice conversation function based on a user's intention to speak (e.g., talk, chat) is desired.

In a method using a wake-up word, a guide robot always detects a voice signal of a preset keyword first, and then triggers a voice conversation only when the keyword is spoken. In order to give a command to the guide robot or to interact with the guide robot through this wake-up word, the user first utters a preset wake-up word, and the guide robot needs to recognize it.

In this regard, in the international patent application No. WO2017/217978 A1 (hereinafter, referred to as "Related Art Document 1"), a configuration of activating a speech application through at least one wake-up word, determining whether a wake-up word is included in an uttered speech, and displaying information indicative of automated speech recognition is disclosed.

In addition, in Korean Patent Application No. 10-2014-0166478 (hereinafter, referred to as "Related Art Document 2"), an operation in which a first processor using a clock designated in a low-power mode of an electronic device recognizes a voice signal input through a microphone, and a second processor is activated to perform voice recording when the recognized voice signal is a preset keyword is disclosed.

In both of Related Art Documents 1 and 2, a speed interaction may be performed only when a voice signal of a preset keyword, namely, a wake-up word is uttered. The operation based on such a wake-up word requires wake-up word recognition engine tuning or training, and also prompts a server cost for detecting the wake-up word. In addition, there is a problem that, in general, a wake-up word set once cannot be changed, and additional development is required for such a change.

Accordingly, in Korean Patent Application No. 10-2019-0078593 (hereinafter, referred to as "Related Art Document 3"), a configuration of recognizing a gesture, other than an utterance of a wake-up word, through machine learning or a deep neural network model, and starting a speech interaction through a gesture matching a preset wake-up word is disclosed. However, in the situation of Related Art Document 3, there is a problem in that only users who know a specific gesture to match in advance can use it. For example, there is a problem in the existing art, in that a user needs prior training or prior knowledge of how to use a specific voice controlled device or robot and what rules to follow, such knowing a specific wake-up work or specific gesture ahead of time. This can be off putting or inconvenient to new users, users without technical expertise or technical savvy, or users who may only interact once with a certain voice controlled device.

SUMMARY OF THE DISCLOSURE

Therefore, the present disclosure describes a guide robot capable of allowing a user, who does not already know a wake-up word or a specific gesture matching the wake-up word a head of time, to perform speech interaction (voice conversation), and an operating method thereof.

The present disclosure also describes a guide robot capable of accurately recognizing a user's intention to speak by using only a sensor and a camera disposed in a robot, without additional components, and an operating method thereof.

The present disclosure further describes a guide robot capable of preventing misrecognition in advance by starting a conversation in a manner of inducing a user to utter a customized wake-up word only when it is determined that the user intends to speak, and an operating method thereof.

The present disclosure further describes a guide robot capable of allowing an administrator to appropriately change a user-customized wake-up word related to the start of voice conversation, without an additional cost for a server, and an operating method thereof A guide robot according to an implementation of the present disclosure can perform a voice conversation mode by determining whether a user intends to use a guide robot only by detecting the user's approach (e.g., proximity) and face angle without a wake-up word.

In addition, the guide robot according to an embodiment of the present disclosure can provide a digital signage on a screen while traveling in a normal mode, stop the provision of the digital signage and output usage guide information when the normal mode is switched to a voice conversation mode according to the user's intention to use the guide robot.

A guide robot according to one implementation can include a travel unit to travel a main body, a touch screen and a camera disposed on the main body, a sensor to detect a user's approach, a voice reception module to receive a voice in an activated state, and a control unit to display at least one digital signage on the touch screen. In this situation, the control unit can be configured to stop the traveling of the main body and activate the camera, in response to a detection of the user's approach through the sensor, determine that the user intends to use the guide robot based on the user's face and face angle detected through the camera, trigger a voice conversation mode by activating the voice reception module based on the determination, and stop the display of the digital signage and output usage guide information according to the trigger of the voice conversation mode.

In one implementation, the usage guide information can include guide information for inducing utterance of a customized wake-up word for noise filtering, and can be output through a voice output module disposed on the main body.

In one implementation, the control unit can output a voice for inducing the user's query through the voice output module when a voice uttering the customized wake-up word is received through the voice reception module.

In one implementation, the control unit can terminate the voice conversation mode and display the digital signage on the touch screen when the voice uttering the customized wake-up word is not received within a preset period of time or it is determined that the user is not detected any more through the sensor while the voice conversation mode is executed.

In one implementation, the control unit can display the usage guide information on the touch screen, and the displayed usage guide information can include a preset menu screen.

In one implementation, the sensor can include at least one of a camera, an ultrasonic sensor, a LiDAR sensor, and a Time of Flight (ToF) sensor, and user detection ranges respectively corresponding to a front side, left and right sides, and a height with respect to the main body can be preset through the sensor.

In one implementation, the user detection range corresponding to the height with respect to the main body can be set such that a position spaced upward from a bottom surface by a predetermined distance based on the main body is an origin of a user height detection range.

In one implementation, the control unit can control the travel unit to reduce a traveling speed of the main body, in response to the user detected through the sensor being approaching the main body within a first detection range, and stop the traveling of the main body, in response to the user being detected in a second detection range closer to the main body than the first detection range.

In one implementation, the control unit can recognize the user's face through the camera, and determine that the user intends to use the guide robot when a left and right angle change of the face angle, recognized for a preset period of time, is within a preset range.

In one implementation, the control unit can determine that the user does not intend to use the guide robot and control the travel unit to perform avoidance traveling for a preset period of time when the recognition of the user's face through the camera fails or the left and right angle change of the recognized face angle is out of the preset range.

In one implementation, the control unit can display the digital signage again on the touch screen after the avoidance traveling.

A method for operating a guide robot according to one implementation can include: displaying at least one digital signage on a touch screen disposed on a main body of the guide robot; stopping traveling of the main body and activating a camera, in response to a detection of a user's approach through a sensor disposed on the main body; determining that the user intends to use the guide robot based on the user's face and face angle detected through the camera; triggering a voice conversation mode by stopping the traveling of the main body and activating a voice reception module for receiving the user's voice based on the determination; and stopping the display of the digital signage and outputting usage guide information according to the trigger of the voice conversation mode.

In a guide robot and an operating method thereof according to some implementations, even a user who has no knowledge of a predetermined wake-up word or a gesture matching the wake-up word can perform voice conversation without learning.

In a guide robot and an operating method thereof according to some implementations, a user's intention to speak can be accurately recognized by using only a sensor and a camera disposed on the robot.

In a guide robot and an operating method thereof according to some implementations, even after recognizing that a user intends to use the guide robot, a guide voice for inducing the user to utter a customized wake-up word for noise filtering can be output, to minimize a misrecognition, and also various customized wake-up words which are appropriate for various situations can be selectively applied without an additional cost for a server.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain principles of the disclosure. In the drawings.

DETAILED DESCRIPTION OF THE EMBODIMENTS

Figure 1:
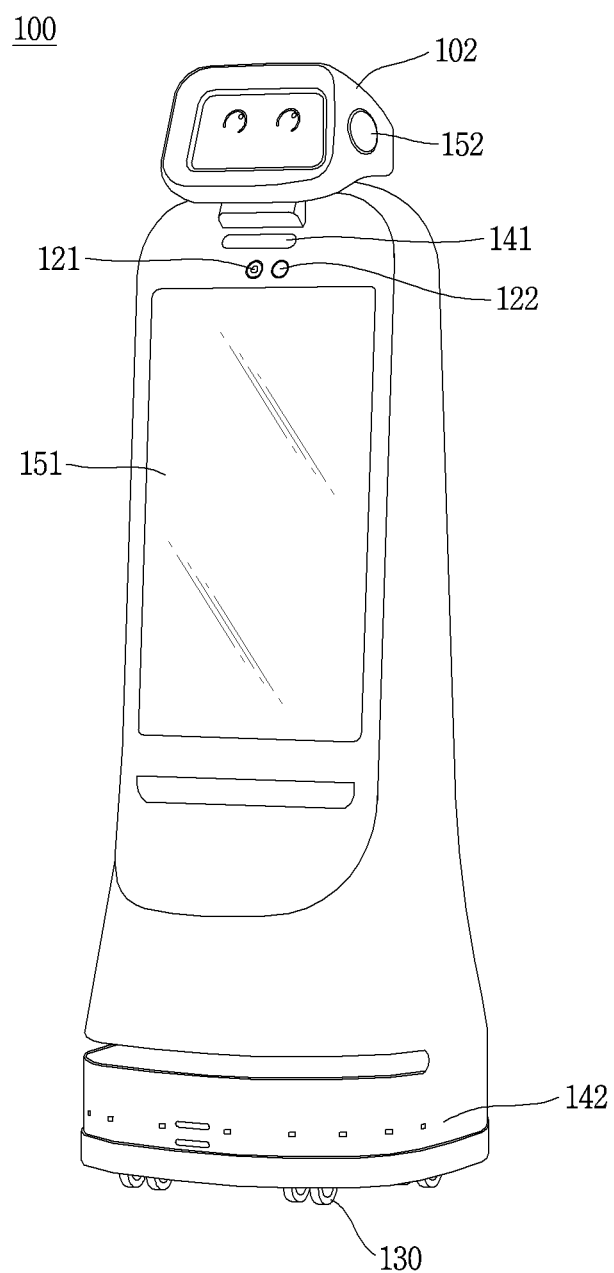
FIG. 1 is a view illustrating an implementation of a guide robot in accordance with an embodiment of the present disclosure.

Hereinafter, an implementation disclosed herein will be described in detail with reference to the accompanying drawings, and the same reference numerals are used to designate the same/like components and redundant description thereof will be omitted. In general, a suffix such as "module" and "unit" can be used to refer to elements or components. Use of such a suffix herein is merely intended to facilitate description of the specification, and the suffix itself is not intended to give any special meaning or function. In describing the present disclosure, if a detailed explanation for a related known technology or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. can be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

On the other hand, a "guide robot" disclosed herein denotes a robot capable of providing various types of information, such as a welcome greeting, directions, product information, a product search, a parking guide, airport information, docent information, a library guide, a tour guide, etc. to users in various public places, for example, airports, amusement parts, shopping malls such as department stores, accommodations such as hotels, cultural spaces such as art galleries and libraries, and the like.

Also, the "guide robot" disclosed herein can perform autonomous driving for guiding a user to a road, a specific place, and the like. In addition, the "guide robot" disclosed herein is not limited to its name, but may refer to any type of robot that has a function capable of responding to a user's query for other purposes (e.g., cleaning, delivery, cart, shopping, artificial intelligence speaker, etc.).

In addition, the "guide robot" disclosed herein can include various output components related to a touch screen, a sound output module, an LED, a tactile sensor, etc. in order to provide information or guidance to a user in various ways (e.g., visual, auditory, tactile).

FIG. 1 is a view illustrating an implementation of a guide robot in accordance with an embodiment of the present disclosure.

Referring to FIG. 1, a guide robot 100 according to an embodiment of the present disclosure can include a head (or head part) 102, a camera 121, a sound output module (e.g., speaker) 152, a voice recognition unit, a touch screen 151, and a travel unit 130. However, in some situations, the guide robot 100 according to an embodiment of the present disclosure can be implemented by excluding some of those components described herein or further including other components.

Appearance of the guide robot 100 according to an embodiment of the present disclosure can be defined by an upper module including the head 102 and the touch screen 151 and a lower module including the travel unit 130. The upper module and the lower module can be detachable from each other.

The upper module provides a user interface that can be changed according to a service environment. The lower module provides a traveling function for moving a main body of the guide robot.

The upper module can be divided into a body part defining a body and having the touch screen 151, and the head part 102 having the camera 121 and the like. However, in some situations, the upper module can be implemented in the form in which the camera is disposed on the body part and the touch screen is disposed on the head part 102.

The camera 121 can be provided on one side of a case of the head part 102 or on one side of a case of the body part. In addition, the camera 121 can be provided in plurality. In this situation, one camera can be provided on a front surface of the main body to face the front, and another camera can be provided on a side surface or a rear surface to face the side/rear. Accordingly, an angle of view covering 360 degrees can be formed.

When the camera 121 is provided in plurality, a first camera can include, for example, a 3D stereo camera. The 3D stereo camera can perform obstacle detection, user face recognition, stereoscopic image acquisition, and the like. The guide robot 100 can detect and avoid an obstacle existing in its moving direction and perform various control operations by recognizing a user, by using the first camera. In addition, the second camera can include, for example, a Simultaneous Localization And Mapping (SLAM) camera. The SLAM camera performs a function of tracking the current location of the camera through feature point matching and creates a 3D map based on the tracking result. The guide robot 100 can recognize its current position using the second camera.

In addition, the camera 121 can recognize an object in a viewing angle range and perform a function of photographing a still image and a moving image of the object. In relation to this, the camera 121 can include at least one of a camera sensor (e.g., CCD, CMOS, etc.), a photo sensor (or image sensor), and a laser sensor. The camera 121 and the laser sensor can be combined to detect a touch of an object to be sensed (detected), with respect to a 3D stereoscopic image. The photo sensor can be stacked on a display element, and configured to scan a motion of an object to be sensed, closely approaching a touch screen. More specifically, the photo sensor is provided with photo diodes and transistors (TRs) mounted in rows/columns. Accordingly, an object placed on the photo sensor is scanned using electric signals which change according to an amount of light applied to the photo diodes. That is, the photo sensor can perform coordinates calculation of an object to be sensed according to a change in an amount of light, and acquire position information regarding the object to be sensed based on the coordinates.

The sound output module 152 can perform a function of notifying information to be provided to the user by voice, and can be, for example, in the form of a speaker. Specifically, a response or search result corresponding to a user's voice, which is received through a sound reception module 122 and a voice recognition module provided in the guide robot 100, is output by voice through the sound output module 152. The sound output module 152 can be disposed on an outer circumferential (peripheral) surface of the head 102 or the body portion having the touch screen 151. Also, the sound output module 152 can output voice information related to a screen (e.g., a menu screen, an advertisement screen, etc.) displayed on the touch screen 151.

A sound reception module 122 performs a function of receiving a user's voice, etc., and can be, for example, in the form of a microphone. The sound reception module 122 can process an external sound signal into electrical voice data, and implement various noise removal or noise canceling algorithms to remove noise generated in the course of receiving the external sound signal.

The touch screen 151 can be located longitudinally in one direction of the body part and can display a screen for providing visual information, for example, guidance information. The touch screen 151 can include a display module, a touch sensor, and a pressure sensor.

The touch screen 151 can be coupled to, for example, a movement guide element, to open and close an inside of the body part. The touch screen 151 can be fixed or coupled to the body part using a fixing member, for example.

In addition, the touch screen 151 can be provided on the rear with respect to the head 102 or provided on the rear as well as the front, considering that the guide robot 100 is linearly moving along a preset path for guiding the user. Alternatively, the head 102 can be rotated by 180 degrees or more before the guide robot 100 linearly moves along a preset path, to change the appearance as if the touch screen 151 is located on the rear.

In this situation, the touch screen 151 performs a function of outputting visual information (e.g., route or path guidance information, query information, etc.) related to a currently-provided service. The user can see the touch screen 151 installed on the rear of the guide robot 100 while following the guide robot 100.

In addition, the touch screen 151 can be provided on each of the front and rear surfaces of the main body. In this situation, different screens can be displayed on a first touch screen disposed on the front surface of the main body and a second touch screen disposed on the rear surface of the main body (e.g., a screen for interacting with the user on the first touch screen, an advertisement screen on the second touch screen). In addition, a display unit for outputting variations in facial expression of the guide robot can be provided on the front surface of the head 102.

The travel unit 130 performs a function of moving and rotating the main body of the guide robot 100. To this end, the travel unit 130 can include a plurality of wheels and driving motors. The operation of the travel unit 130 is controlled according to a control command received by a control unit, and a notification can be provided through an output element such as an LED before and after the travel unit 130 is operated.

Figure 2:
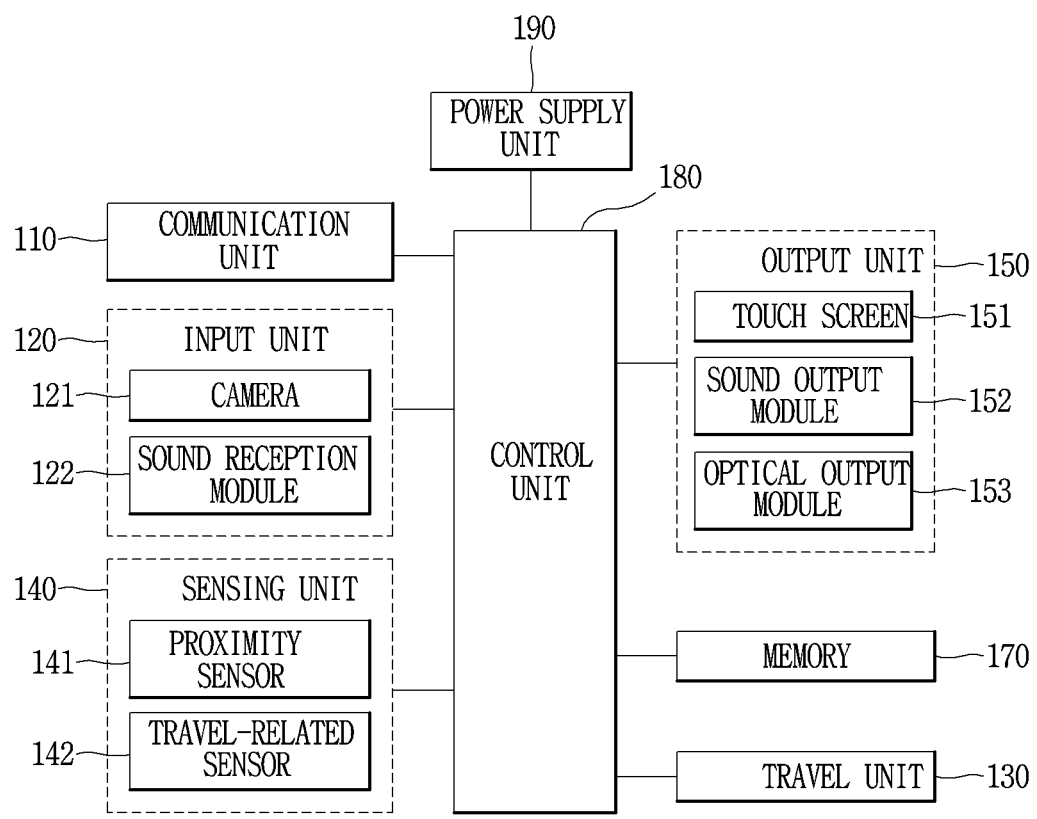
FIG. 2 is a block diagram illustrating an example configuration of the guide robot in accordance with an embodiment of the present disclosure.

FIG. 2 is a block diagram illustrating an example configuration of the guide robot in accordance with an embodiment of the present disclosure.

The guide robot 100 can include a communication unit 110, an input unit 120, a travel unit 130, a sensing unit 140, an output unit 150, a memory 170, a control unit 180, a power supply unit 190, and the like. Those components illustrated in FIG. 2 are not essential for implementing the guide robot, and the guide robot described in this specification can be provided with more or less components than the components listed above.

The communication unit 110 can include at least one module for enabling wireless communication between the guide robot 100 and an external server, for example, an artificial intelligence server or an external terminal. In addition, the communication unit 110 can include at least one module through which the guide robot 100 is connected to at least one network.

The communication unit 110 can perform communications with an artificial intelligence (AI) server and the like by using wireless Internet communication technologies, such as Wireless LAN (WLAN), Wireless Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), Long Term Evolution-Advanced (LTE-A), and the like. The communication unit 110 can also perform communications with an external terminal and the like by using short-range communication technologies, such as BLUETOOTH™, Radio Frequency Identification (RFID), Infrared Data Association (IrDA), Ultra Wideband (UWB), ZIGBEE, Near Field Communication (NFC), and the like.

The input unit 120 can include a camera 121 or an image input module for inputting an image (video) signal, a sound reception module 122 for inputting a sound (audio) signal, for example, a microphone, a user input unit (e.g., a touch key, a mechanical key, etc.), and the like. The signal data, voice data, and image data collected by the input unit 120 can be analyzed and processed as a control command.

The travel unit 130 performs a function of moving and rotating the main body of the guide robot 100. To this end, the travel unit 130 can include a plurality of wheels and driving motors. The operation of the travel unit 130 can be controlled according to a control command received by a control unit 180, and a notification can be output through an optical output module 153 such as an LED before and after the travel unit 130 is operated.

The sensing unit 140 can include at least one sensor for sensing at least one of internal information related to the guide robot, surrounding environment information of the guide robot, and user information. For example, the sensing unit 140 can include a proximity sensor 141, an illumination sensor, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (e.g., the camera 121), a microphone, a battery gauge, an environment sensor (e.g., a barometer, a hygrometer, a thermometer, a radiation detection sensor, a thermal sensor, and a gas sensor, among others), a chemical sensor (e.g., an electronic nose, a health care sensor, a biometric sensor, etc.), and the like. Meanwhile, the guide robot disclosed herein can combine and use information sensed by at least two of those sensors. In addition, the sensing unit 140 can include a travel-related sensor 142 that detects an obstacle, a floor state, and the like.

Examples of the proximity sensor 141 can include a transmission type photoelectric sensor, a direct reflection type photoelectric sensor, a mirror reflection type photoelectric sensor, a high frequency oscillation type proximity sensor, a capacitive proximity sensor, a magnetic proximity sensor, an infrared proximity sensor, and the like. Also, the proximity sensor 141 can include at least one of a navigator camera, an ultrasonic sensor, a LiDAR, and a ToF sensor, and can be configured to recognize an approach and a location of an object to be sensed, e.g., a sensing target, such as a user.

The output unit 150 can generate an output related to visual information, auditory information, tactile information, or the like and can include at least one of the touch screen 151, the sound output module 152, and an optical output module 153. The touch screen 151 can be interlayered or integrally formed with the touch sensor to realize a touch screen. The touch screen can function as a user input unit for providing an input interface between the guide robot 100 and the user, and simultaneously provide an output interface between the guide robot 100 and the user.

The optical output module 153 outputs a signal for notifying an occurrence of an event of the guide robot 100 using light emitted from a light source. For example, when a movement command is transmitted to the travel unit 130 of the guide robot 100, a signal for notifying the movement is output through the optical output module 153.

The control unit 180 can include a learning data unit or a learning processor to perform an operation related to an artificial intelligence technology of the guide robot. The learning data unit can be configured to receive, classify, store, and output information to be used for data mining, data analysis, intelligent decision, and machine learning algorithms and technologies. The learning data unit can include at least one memory unit configured to store information, which is received, detected, sensed, generated, or predefined through the guide robot or information output through the guide robot in different manners, or to store data which is received, detected, sensed, generated, predefined or output through other components, devices and terminals.

In one implementation, the learning data unit can be integrally provided in the guide robot or can include a memory. In one implementation, the learning data unit can be implemented in the memory 170. However, the present disclosure is not limited to this. Alternatively, the learning data unit can be implemented in an external memory associated with the guide robot 100, or can be implemented in a memory included in a server that can communicate with the guide robot 100. In another embodiment, the learning data unit can be implemented in a memory which is maintained in a cloud computing environment, or in another remote controllable memory which is accessible by the guide robot through a communication method such as network communication.

The learning data unit is generally configured to store data, which is to be used in supervised or unsupervised learning, data mining, predictive analysis or other machine learning technologies, in at least one database to identify, index, classify, manipulate, store, search for and output the data. Information stored in the learning data unit can be used by the control unit 180, which uses at least one of different types of data analysis, machine learning algorithms, and machine learning technologies, or by a plurality of control units (e.g., one or more processors) included in the guide robot. Examples of such algorithms and technologies can include K-nearest neighbor systems, fuzzy logic (e.g., possibility theory), neural networks, Boltzmann machines, vector quantization, pulsed neural nets, support vector machines, maximum margin classifiers, hill-climbing, inductive logic systems, Baysian networks, Petri nets (e.g., finite state machines, Mealy machines, Moore finite state machines, etc.), classifier trees (e.g., perceptron trees, support vector trees, Markov trees, decision tree forests, random forests, etc.), pandemonium models and systems, clustering, artificially intelligent planning, artificially intelligent forecasting, data fusion, sensor fusion, image fusion, reinforcement learning, augmented reality, pattern recognition, automated planning, and the like.

The control unit 180 can determine or predict executable operations of the guide robot based on information decided or generated using data analysis, machine learning algorithms, and machine learning technologies. For this, the control unit 180 can request, search, receive, or utilize data of the learning data unit. The control unit 180 can perform various functions for implementing a knowledge-based system, an inference system, a knowledge acquisition system, and the like, and can perform various functions including a system (e.g., a fuzzy logic system) for fuzzy inference, an artificial neural system, and the like.

The control unit 180 can also include sub modules, such as an I/O processing module, an environmental condition module, a speech-to-text (STT) processing module, a natural language processing module, a task flow processing module, a service processing module, and the like, which enable voice and natural language processing. Each of the sub modules can have access authority for at least one system or data and model, or its subset or superset. Here, subjects for which each of the sub modules has the access authority can include scheduling, a vocabulary index, user data, a task flow model, a service model, and an automatic speech recognition (ASR) system.

In some implementations, based on the data in the learning data unit, the control unit 180 can also be configured to detect and sense user requirements, based on contextual conditions or a user's intent represented by a user input or a natural language input. When the operation of the guide robot is decided based on the data analysis, the machine learning algorithm, and the machine learning technology, the learning data unit can control components of the guide robot to execute the decided operation. The control unit 180 can execute the decided operation by controlling the guide robot based on a control command.

The memory 170 stores data supporting various functions of the guide robot 100. The memory 170 can store a plurality of application programs (or applications) driven in the guide robot 100, data for operations of the guide robot 100, and command words. In addition, the memory 170 can store a variable customized wake-up word for performing a voice conversation function with the user.

The memory 170, for example, can include one or more types of storage mediums including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like.

The control unit 180 typically controls the Overall operation of the guide robot 100, in addition to the operations related to the application programs. The control unit 180 can provide to the user or process appropriate information or functions by processing signals, data, information, etc. input or output through the above-mentioned components, by activating application programs stored in the memory 170, or by controlling the travel unit 130.

Under the control of the control unit 180, the power supply unit 190 receives external power or internal power and supplies such power to the respective components included in the guide robot 100. The power supply unit 190 can include a battery, which can be an internal battery or a replaceable battery.

At least some of the respective components can cooperatively operate to implement operations, controls or control methods of the guide robot in accordance with various embodiments described below. In addition, the operations, controls, or control methods of the guide robot can be implemented on the guide robot by running at least one application program stored in the memory 170.

Various implementations described below can be implemented in a medium readable by a computer or similar devices using, for example, software, hardware, or a combination thereof.

Figure 3:
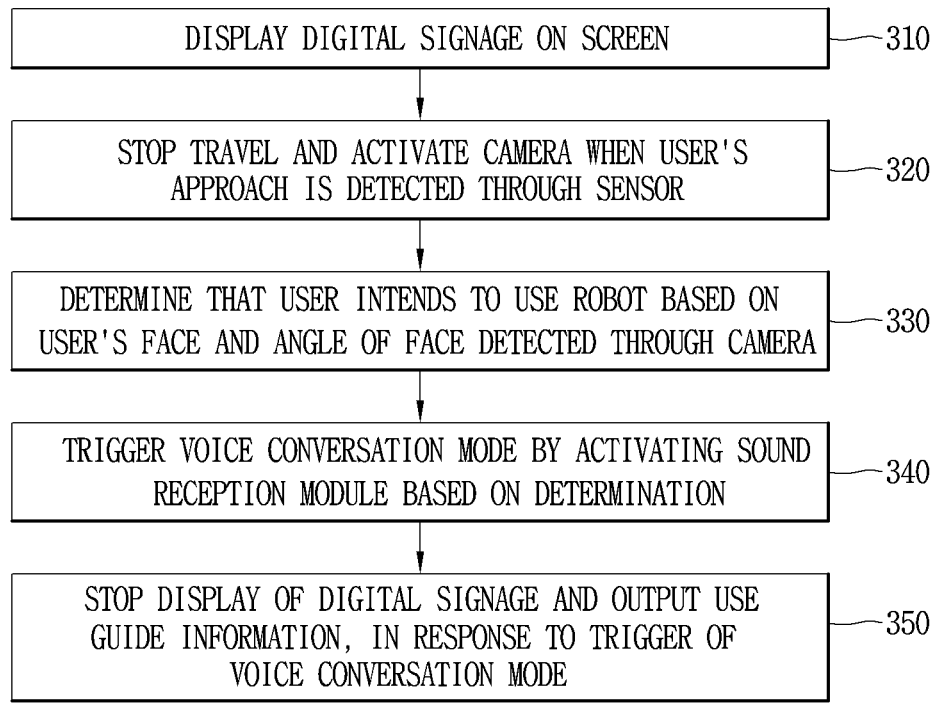
FIG. 3 is a flowchart illustrating a method of operating a guide robot in accordance with an embodiment of the present disclosure.

FIG. 3 is a flowchart illustrating a method of operating a guide robot in accordance with an embodiment of the present disclosure. FIG. 3 illustrates an operating method 300 for executing a voice conversation (talk) mode by recognizing a user's intention to speak without a user's utterance of a wake-up word while the guide robot operates in a normal mode (e.g., default mode or patrolling mode). In addition, each step of the operating method 300 illustrated in FIG. 3 can be implemented as a program instruction executed by at least one processor.

In FIG. 3, the guide robot 100 (FIG. 1) displays at least one digital signage on the touch screen provided on the main body in a normal mode (310).

Specifically, in the normal mode (e.g., default mode or patrolling mode), the guide robot 100 can display at least one digital signage through the touch screen 151 (FIG. 1) while traveling by itself along a stored map route, and output sounds related to the displayed digital signage through the sound output module 152 (FIG. 1). Here, the at least one digital signage can include predetermined image information, advertisement information associated with a place where the guide robot is located, promotion information, news information, etc. In one implementation, the touch screen 151 can be disposed on each of the front and rear surfaces of the guide robot 100. In this situation, different digital signages can be displayed on the first touch screen and the second touch screen.

As such, in the normal mode, while the guide robot displays the digital signage on the screen during an autonomous travel, the guide robot 100 can detect the user's approach through a sensor disposed on the main body (e.g., a proximity sensor). In response to the user's approach being detected through the sensor as described above, the guide robot 100 stops the traveling of the main body and activates a camera provided on the main body (320). Specifically, when it is detected through a sensor that the user is located within a predetermined range from the main body of the guide robot 100, the guide robot 100 can confirm the user's presence by turning on the camera 121 and stop its travel by gradually reducing a traveling speed. In this situation, the digital signage can be continuously displayed on the touch screen 151.

Next, after confirming the presence of the user approached through the camera, the user's face is recognized and changes in angle of the recognized face are monitored. The guide robot determines that the user intends to use it based on the user's face and the angle of the face which are detected through the camera (330).

Specifically, when the change in angle of the user's face detected through the camera for a predetermined period of time (e.g., 5 seconds) is within a preset range (e.g., 20 degrees to left and right) and it is monitored that the user stares at the guide robot (camera) for a predetermined period of time (e.g., 300 ms), the guide robot can determine that the user approached intends to use it (e.g., a situation where a user walks over to the guide robot and stares at the guide robot for a predetermined amount of time). On the other hand, when the change in angle of the user's face detected through the camera for the predetermined period of time (e.g., 5 seconds) is out of the preset range (e.g., 20 degrees to left and right) and/or it is monitored that the user does not stare at the guide robot (camera) for the predetermined period of time (e.g., 300 ms), the guide robot can determine that the user approached does not intend to use it (e.g., a situation where a user walks nearby or past the guide robot without intending to use the guide robot). At this time, the predetermined period of time (e.g., 5 seconds), the preset range of the change in the face angle (e.g., 20 degrees to left and right), and/or the predetermined period of time (e.g., 300 ms) that the user gazes at the guide robot, which can be factors for determining whether the user intends to use the guide robot can be variably set depending on various situations.

Thereafter, the guide robot executes a voice conversation mode by activating the sound reception module (or voice reception module) 122 for receiving the user's voice based on the determination (presence of intention to use the robot) (340). In this way, the guide robot can better prevent false positives or false starts. Here, the activation of the sound reception module (or voice reception module) indicates that the microphone provided in the guide robot is turned on and the sound reception module is in a listening state capable of receiving the user's voice. Also, when the sound reception module is in the activated state, the output of the sound related to the digital signage can be stopped.

Then, the guide robot stops the display of the digital signage and outputs a usage guide information, in response to the execution of the voice conversation mode (350). Accordingly, the guide robot can perform a voice conversation-based interaction with the user who is determined to intend to use the guide robot. Here, the usage guide information can be provided visually through the touch screen 151 and/or can be provided aurally through the sound output module 152.

In one implementation, the usage guide information can include guide information for inducing utterance of a customized wake-up word set for noise filtering (e.g., "If you need help, look at my face and say "Hey, Cloy""). In this way, an individual guide robot can be accurately selected, even from among a group of guide robots located in a noisy environment.

Here, the set customized wake-up word is distinguished from a wake-up word for entering a voice recognition function. The set wake-up word can be changed by an administrator and a separate server management for setting the wake-up word is unnecessary. In this situation, when the user utters the customized wake-up word, in response to the induction for the user to utter the customized wake-up word, the guide robot can continuously operate in the voice conversation mode. On the other hand, when the customized wake-up word has not been uttered for a predetermined period of time, the guide robot can determine that the user does not intend to use it and terminate the voice conversation mode.

In another example, the usage guide information can include guide information (e.g., "To use various menus, please touch me") for inducing a touch through a pop-up window displayed on the touch screen. In this situation, the guide robot can perform a corresponding operation by applying the user's touch-based input to the voice conversation mode. In another example, before outputting the usage guide information, the guide robot can output predetermined greeting information (e.g., "Hello?") to arouse the interest of the user who is intending to use it. In this situation, a welcome expression can be output through the display unit provided on the head part 102 (FIG. 1) of the guide robot.

Figure 4A:
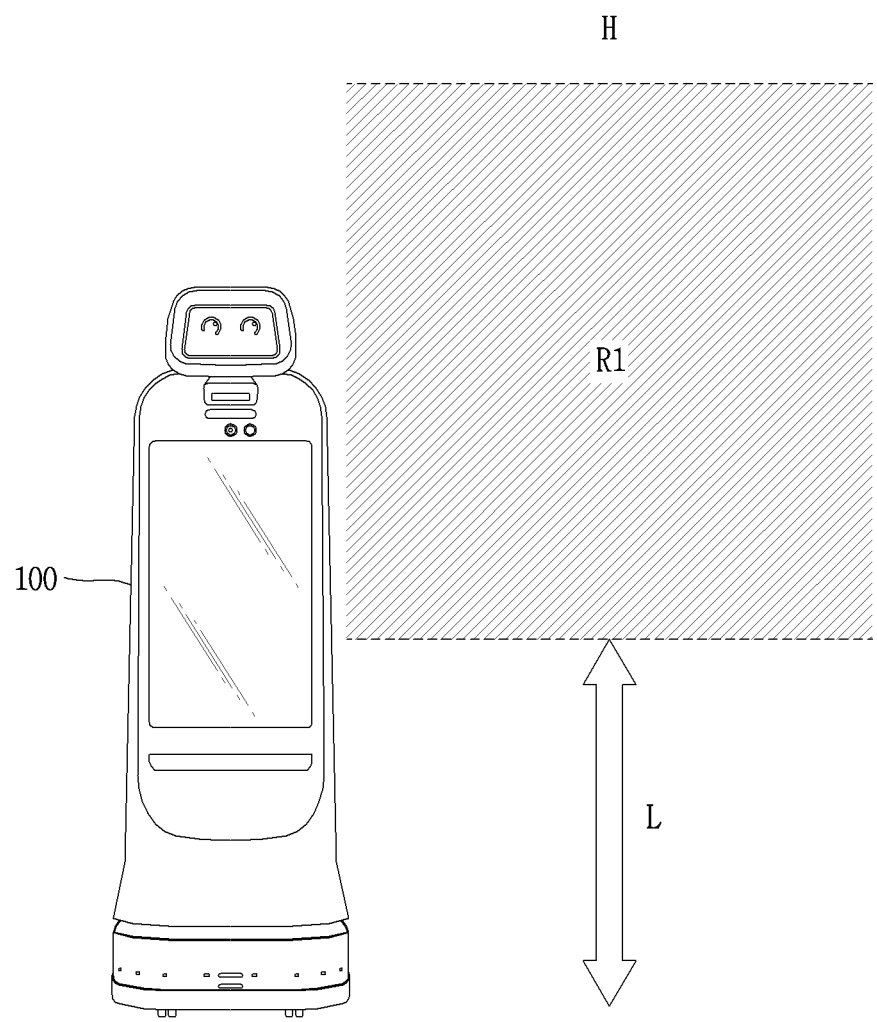
FIGS. 4A and 4B are diagrams illustrating a user detection range of a guide robot in accordance with an embodiment of the present disclosure.
Figure 4B:
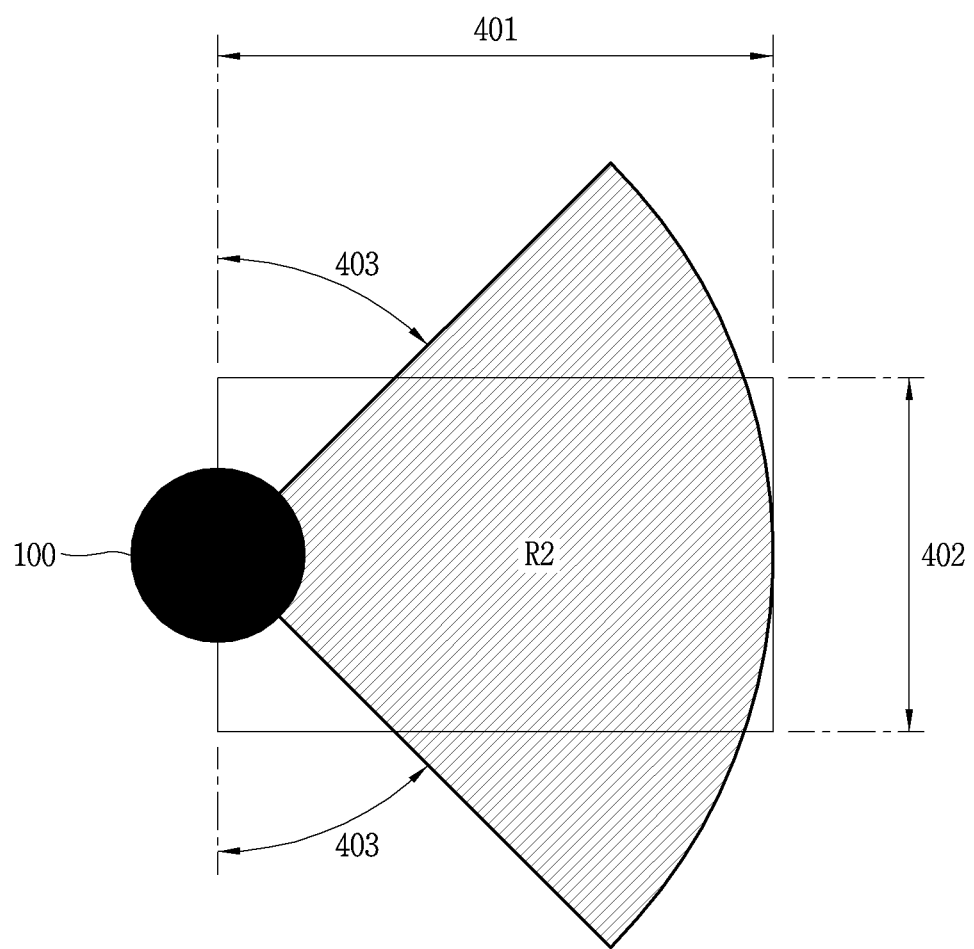

FIGS. 4A and 4B are diagrams illustrating a user detection range of a guide robot in accordance with an implementation of the present disclosure. The guide robot can detect the user's approach through a sensor (e.g., the proximity sensor 141 in FIG. 1) while traveling in the normal mode. The sensor is distinguished from the travel-related sensor 142 for detecting an obstacle, a floor state, and the like during the travel of the guide robot. However, the 'sensor' disclosed herein can refer to a proximity sensor that detects whether the user approaches nearby (e.g., getting close, close, getting far, etc.) unless otherwise noted. In addition, since the process of detecting the user's approach disclosed below is carried out before the guide robot activates the camera, it can actually be similar to the detection of an obstacle.

In one implementation, at least one of a camera, an ultrasonic sensor, a LiDAR sensor, and a ToF sensor can be included as a sensor for detecting a user's approach. In addition, the guide robot can preset a front detection range, a left-right detection range, and a height detection range through the sensor based on the main body of the guide robot and these detection ranges can be stored in a memory and can vary through a user input, etc.

FIG. 4A illustrates the height detection range R1 set based on the main body of the guide robot. In one implementation, the height detection range R1 for the guide robot to determine the user's approach can be set such that a position L spaced apart from a bottom surface by a predetermined distance based on the main body is the origin of the user height detection range. For example, for an obstacle detected at a position lower than a height (e.g., 60 cm) of an infant, the height (60 cm) of the infant can be set as the origin such that the obstacle is determined to be an animal or object, not a person. However, the height (60 cm) of the origin can vary depending on circumstances. In one implementation, the height detection range R1 for the guide robot to determine the user's approach can be excluded in the situation of a height range H which is out of a predetermined height. For example, when the guide robot is approaching a facility other than a person, the facility can be excluded from the height detection range, to prevent the guide robot from stopping its travel or activating the camera due to misrecognition. In this situation, the predetermined height can be set, for example, to about 2.5 m in consideration of the height of a tall person, but is not limited thereto, and can be changed through an input or the like.

FIG. 4B illustrates a front and left/right detection range R2 set based on the main body of the guide robot. A length 401 of the front detection range for the guide robot to determine the user's approach can be preset within a range of 0.5 m to 5 m with respect to the main body. The length 401 of the front detection range can vary based on characteristics of a place where the guide robot is located and a user density. In addition, a length 402 of a left and right detection range for the guide robot to determine the user's approach can be preset within a range of 40 cm to 4 m in a viewing angle range 403 of about 45 degrees with respect to the main body. The length 402 of the left and right detection range can vary based on the characteristics of the place where the guide robot is located and the user density.

In one implementation, when the presence of the user is detected in an area R2 of the front detection range of 1.0 m and the left and right detection range of 0.8 m within a viewing angle range of about 45 degrees with respect to the main body of the guide robot, it can be determined to be the user's approach according to an embodiment of the present disclosure. In this situation, the control unit 180 (FIG. 1) of the guide robot can output an LED notification through the optical output module 153 (FIG. 1) or output a change in facial expression through the display of the head part 102, to externally display that the user's approach has been recognized, in order to provide visual feedback to the user.

In one implementation, when it is determined that the density of users around the guide robot is high (e.g., a crowded type of situation), the control unit 180 can vary the detection range for determining the user's approach to be narrower and/or shorter than before. In this situation, the traveling speed of the guide robot can be changed to be slower than before. Additionally, when it is determined that the density of users around the guide robot is low (e.g., note very crowded), the control unit 180 can vary the detection range for determining the user's approach to be wider than before. For such determination, the control unit 180 of the guide robot can determine the user density through the proximity sensor while rotating the head 102 of the main body during the travel in the normal mode.

Figure 5A:
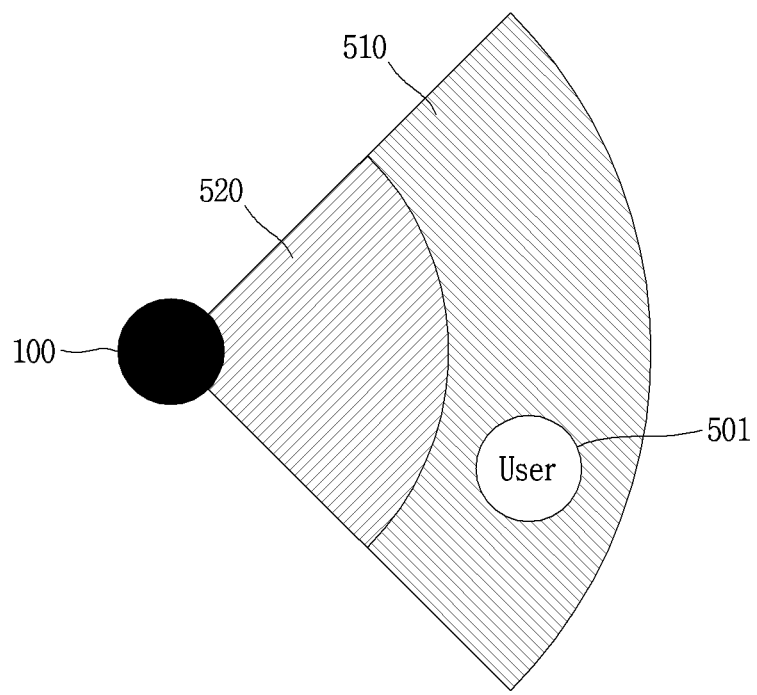
FIGS. 5A and 5B are diagrams illustrating a method by which a guide robot changes its travel, in response to a detection of a user's approach, according to an embodiment of the present disclosure.
Figure 5B:
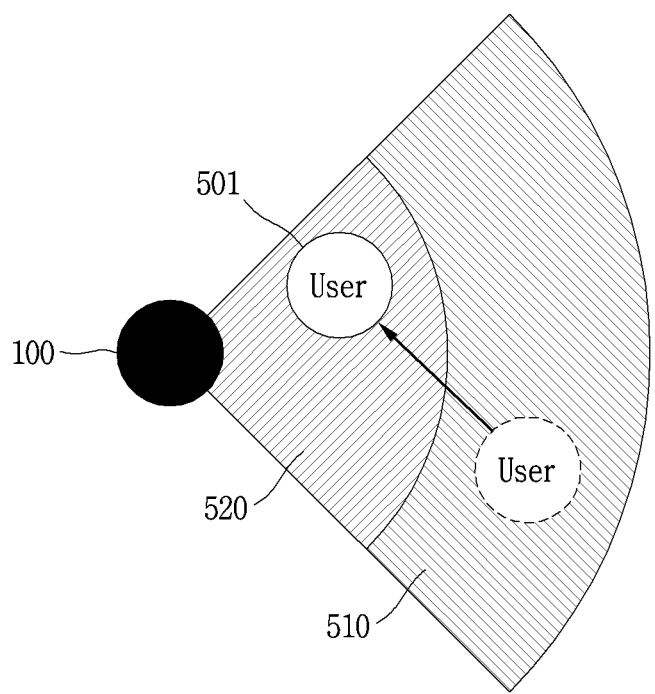

FIGS. 5A and 5B are diagrams illustrating a method by which the guide robot according to the implementation changes its travel, in response to a detection of a user's approach.

The guide robot can stop its travel and activate the camera by determining whether the user's approach is 'continued'. Whether the user is approaching or moving away from the guide robot is determined through the sensor based on a signal arrival time and/or a signal strength when the signal output from the sensor hits an obstacle and returns.

In one implementation, the control unit 180 of the guide robot can reduce the traveling speed of the main body, in response to the user's continued approach to the main body in a first detection range, detected through the sensor. For example, as illustrated in FIG. 5A, while the guide robot 100 is traveling, when a user 501 is detected in a first area 510 corresponding to a set approach detection range, more specifically, the first detection range, the traveling speed is gradually reduced.

Thereafter, as illustrated in FIG. 5B, as the user 501 approaches even closer to the main body in the first area 510 corresponding to the first detection range, when the guide robot detects the user in a second area 520 corresponding to a second detection range, the travel of the main body can be stopped. That is, in order to prevent sudden braking of the guide robot, the traveling speed is gradually reduced from when the user is detected in the first area 510, and the travel is stopped only when the user is continuously approaching to be detected in the second area 520.

On the other hand, when the user has been detected in the first area 510 but does not enter the second area 520 within a predetermined period of time, it can be determined that the user's approach has not been continued (e.g., the user intends to continue walking past the guide robot). Accordingly, the guide robot can travel by increasing its speed to the original traveling speed. And, the camera can be maintained in an inactive state.

Also, while the guide robot monitors whether a first user who has approached the first area 510 continues to approach, a new user approaching the second area 520 can be detected. In this situation, the guide robot can operate to determine whether the second user located within a closer detection range with respect to the main body intends to use the guide robot.

In one implementation, the guide robot can detect a user's approach within a predetermined detection range based on the rear and/or lateral sides of the main body as well as the front of the main body. To this end, the guide robot can further include a sensor disposed on the rear and/or lateral sides, in addition to the front side of the main body. In this situation, the control unit 180 of the guide robot can control the head 102 of the main body to rotate toward a direction that the user approaches when the user's approach is detected based on the rear or lateral side of the main body.

Figure 6A:
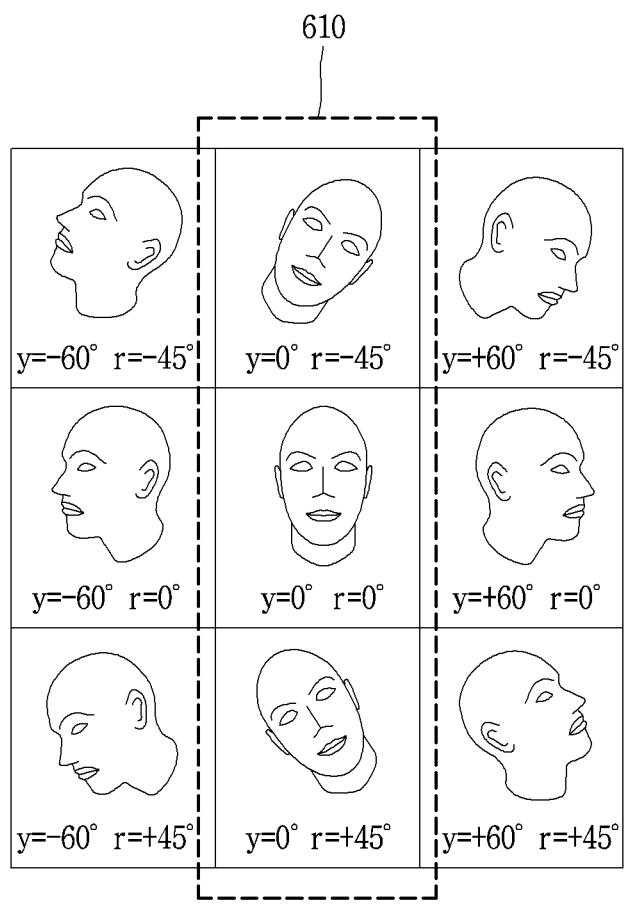
FIGS. 6A and 6B are diagrams illustrating a method by which a guide robot recognizes a user's face angle in order to determine the user's intention to use the robot, according to an embodiment of the present disclosure.
Figure 6B:
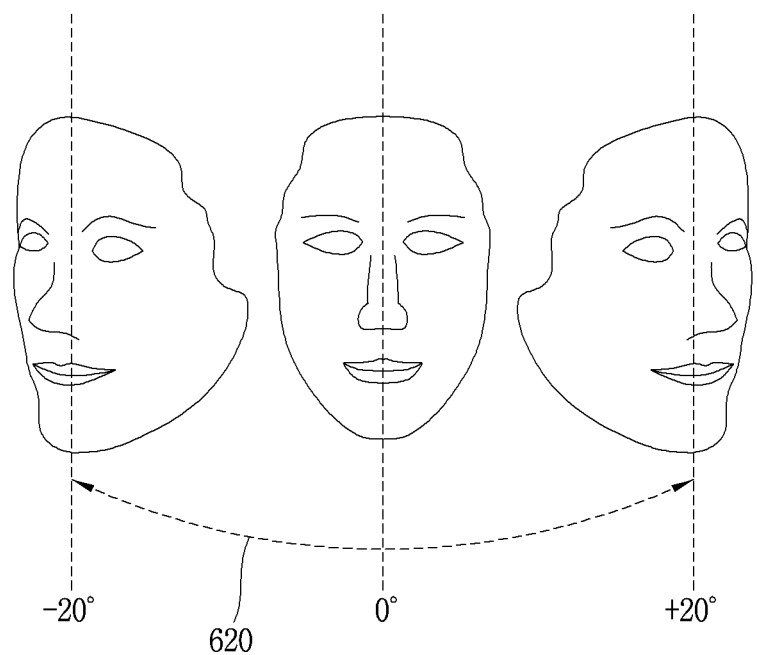

FIGS. 6A and 6B are diagrams illustrating a method by which the guide robot according to the implementation recognizes a user's face angle in order to determine the user's intention to use the robot. The guide robot according to an embodiment of the present disclosure stops traveling when the user's approach is detected, and then activates the camera to first confirm the approaching user's face. For example, the camera can be maintained in an off state or a deactivated stated, until the user's approach is detected. In this way, false positives can be better prevented and power and resources can be conserved. Thereafter, the guide robot analyzes a pattern of the user's behavior to recognize the intention of the approached user to use the robot. To this end, in the present disclosure, a change in angle of the user's face is monitored.

In one implementation, the control unit 180 of the guide robot can recognize the face of the user approached through the activated camera. When the change in angle of the recognized face in the left and right direction for a preset period of time is within a preset range, the control unit can determine that the user intends to use the guide robot. As such, the control unit 180 of the guide robot can recognize the user's face through the camera, to determine whether a subject approaching, detected through a sensor, is an obstacle or a person (e.g., it is not sure yet whether the subject approaching is the user or not). When the face is recognized, since the detected approaching subject is a person, the control unit 180 monitors the change in angle of the face which corresponds to the user's behavior pattern. On the other hand, when the face is not recognized, the control unit 180 can determine that the subject approaching is an obstacle and thus perform avoidance driving.

FIG. 6A illustrates face angles corresponding to various gaze directions (or face directions) of the user. It can be confirmed that a face angle change 610 corresponding to a direction in which the user gazes at the guide robot has a y-axis value of 0, and the left and right face angles are within the range of ±5 to 45 degrees. On the other hand, when the user does not stare at the guide robot, it can be confirmed that the y-axis value has a positive value or a negative value within a range of ±45 degrees. This means that the user is not staring at the guide robot.

The guide robot monitors the face angle corresponding to the user's gaze direction (or face direction) for a predetermined period of time through the camera. In this situation, the predetermined period of time can be set to, for example, 0.5 seconds to 15 seconds, which can vary depending on circumstances.

As a result of the monitoring for the predetermined period of time, when the user shows the face angle change 610 within the detection range set by the user, the control unit 180 of the guide robot determines that the user intends to use the guide robot. The face angle change 610 within the set detection range should be continuously maintained for a predetermined threshold time. In this situation, the predetermined threshold time is set within a range of, for example, 100 ms to 5 seconds, and can vary depending on situations.

On the other hand, as a result of the monitoring for the predetermined period of time, when a behavior pattern in which the user does not stare at the guide robot (e.g., a situation where the y-axis value of the face angle in FIG. 6A has a positive or negative value) is continuously detected or the face angle change 610 in the set detection range is observed for a period of time shorter than the predetermined threshold time, the control unit 180 of the guide robot can determine that the user does not intend to use the guide robot.

FIG. 6B illustrates a left and right face angle range 620 corresponding to a direction in which the user gazes at the guide robot. The left and right face angle range 620 corresponding to the direction that the user gazes at the guide robot can be set to a detection range of ±20 degrees in the left and right directions, but is not limited thereto, and can vary depending on situations. The control unit 180 of the guide robot monitors the change in the angle of the user's face through the camera for a predetermined period of time (e.g., about 5 seconds).

As a result of the monitoring, when the predetermined left and right face angle range 620 is detected for a predetermined threshold time (e.g., 300 ms), the control unit 180 of the guide robot can determine that the user intends to use the guide robot (stop the travel), and output usage guide information. As a result of the monitoring, when the left and right face angle range 620 is detected only for less than the predetermined threshold time and the predetermined period of time (e.g., about 5 seconds) has elapsed or the user's approach is no longer detected, the control unit 180 of the guide robot can determine that the user does not intend to use the robot and perform an operation corresponding to it (e.g., avoidance driving).

Meanwhile, in another implementation, the guide robot can be configured to perform the detection of the user's approach, the face recognition, and the detection of the face angle while traveling in the normal mode, and stop the travel when it is determined that the user intends to use the robot. In this situation, the control unit 180 of the guide robot can control the travel unit 130 to travel slower than a normal traveling speed while the detection of the user's approach, the face recognition, and the detection of the face angle are carried out. Also, since the guide robot slows down when a person approaches nearby, intention detection accuracy can be improved, since there is less movement and more precise measurements can be carried out. Also, the control unit 180 can control the head 102 to rotate toward a direction that the user approaches, in order to recognize the user's face and detect the face angle.

Figure 7A:
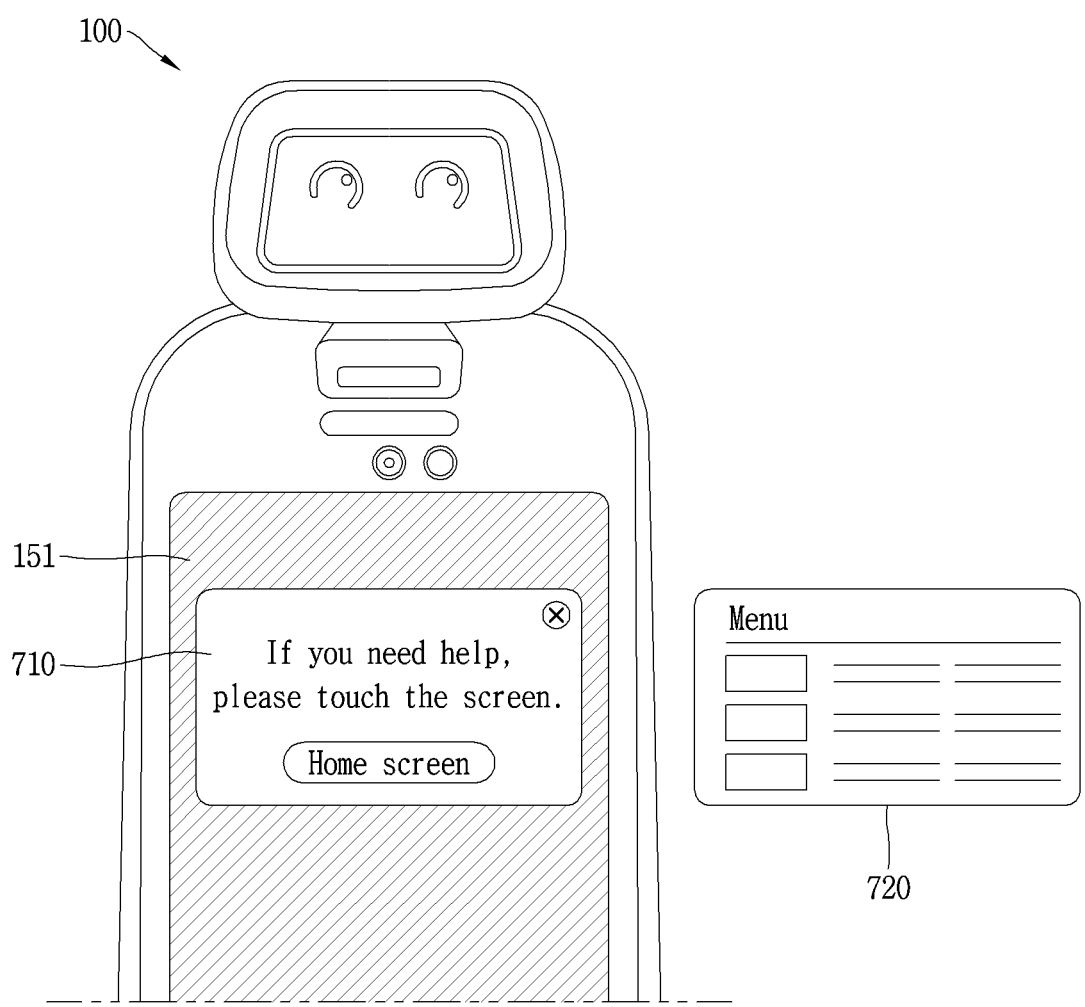
FIG. 7A is a diagram illustrating an example of displaying usage guide information on a touch screen of a guide robot, according to an embodiment of the present disclosure.

FIG. 7A is a diagram illustrating an example of displaying usage guide information on a touch screen of the guide robot according to the implementation.

When it is determined that the user intends to use the guide robot through the detection of the user's approach, the face recognition, and the detection of the face angle change, a voice conversation mode can be executed and usage guide information can be output. When the voice conversation mode is executed, the guide robot no longer outputs the screen (or video) of the digital signage which was output in the normal mode and sounds corresponding thereto, and activates the voice reception module (e.g., microphone) and the voice recognition module to perform a voice-based conversation with the user. That is, the guide robot is switched from the normal mode to the voice conversation mode.

In one implementation, the usage guide information can be displayed on the touch screen 151 of the guide robot, and the displayed usage guide information can include a preset menu screen, current location information, surrounding map information, and the like. In this situation, the usage guide information can include a guide message for inducing a user action (e.g., uttering a preset keyword/customized wake-up word, touching the screen, etc.) for outputting a preset menu screen and the preset menu screen can be output based on the user's response to the guide message.

In FIG. 7A, the guide robot can output a first screen 710 including a guide message (e.g., "If you need help, please touch the screen.") for inducing the user's action, instead of outputting a digital signage on the touch screen 151. When a touch input is received on the first screen 710 or a predetermined condition is satisfied (e.g., a reception of the user's response voice, etc.), the guide robot can output a second screen 720 including a preset menu screen. The user can receive desired information through a touch interaction on the second screen 720 or can perform a voice-based conversation through the activated voice reception module and voice recognition module.

In this way, even though the user does not know any specific manipulation rules at all a head of time, such as uttering a specific wake-up word for performing the voice-based conversation with the guide robot or the screen touch (when the touch screen 151 is touched, the output of the digital signage is stopped and the preset menu screen is output), the guide robot can accurately recognize a user who intends to use the robot, and provide the usage guide information.

Meanwhile, even when the guide robot determines that the user intends to use it by monitoring the user's approach, the face recognition, and the face angle change, a noise filtering operation can be additionally performed to further improve the recognition rate of the user's behavior pattern.

Figure 7B:
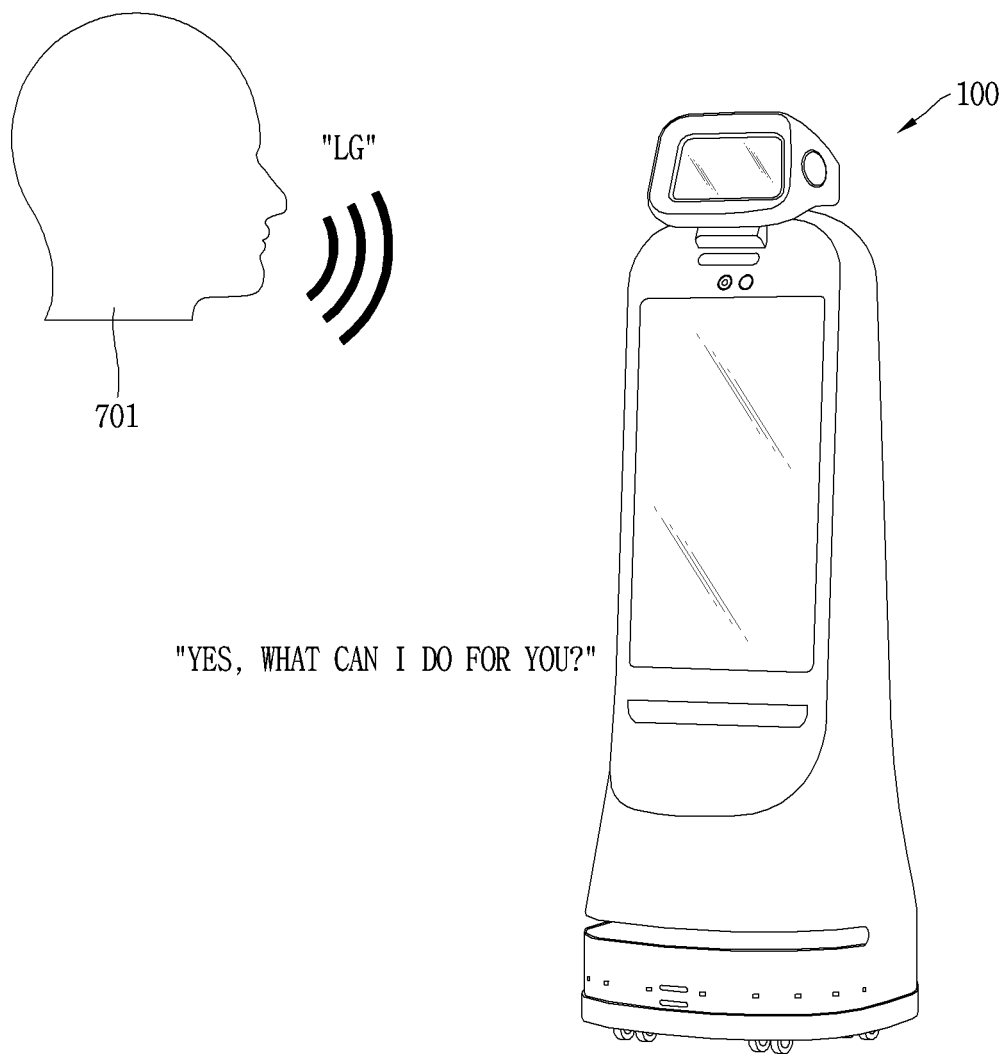
FIG. 7B is a diagram illustrating induction and reception of utterance of a customized wake-up word for noise filtering in a guide robot, according to an embodiment of the present disclosure.

FIG. 7B is a diagram illustrating induction and reception of utterance of a customized wake-up word for noise filtering in the guide robot according to the implementation.

Here, in response to the execution of the voice conversation mode, usage guide information for inducing utterance of a customized wake-up word for noise filtering can be output. This usage guide information can be output in the form of a voice message (e.g., "If you need help, say 'LG' (customized wake-up word) to me") through the voice output module of the guide robot or in the form of a screen message through the touch screen 151. The reason of inducing the user to utter a predetermined customized wake-up word as described above is to make it more clear that the user intends to use the guide robot. Also, prompting the user to say a customized wake-up word can help improve the accuracy of selecting a specific individual guide robot, even when among a group guide robots or in a noisy environment. Accordingly, in this situation, the voice conversation mode is triggered based on the user response to the usage guide information.

In one implementation, the customized wake-up word guided by the guide robot, unlike the wake-up word, can be changed into various types of words that are distinguished from everyday words or to help distinguish an individual guide robot from other guide robots or other voice activated devices. The customized wake-up word can include, for example, a fortis sound or an aspirated sound that is distinguished from an everyday language, and can be set as a word having a length of three to six syllables. Alternatively, based on an input of an administrator of the guide robot, any one word can be set or changed to a customized wake-up word by being selected from a list including a plurality of words that can be set to the customized wake-up word. In this way, the customized wake-up word is similar to the wake-up word in function, but it is distinguished from the wake-up word in that a separate server management is unnecessary and it can be changed to another customized wake-up word.

In FIG. 7B, when a user 701 utters the guided customized wake-up word (e.g., "LG"), the guide robot outputs a response voice (e.g., "Yes, what can I do for you?"), and then performs a voice conversation with a user 701. Specifically, the guide robot 100 is switched into a listening state or conversation mode, and receives, analyzes, and processes a voice uttered by the user. In addition, in order to respond to the user voice as the processing corresponding to the user voice, the guide robot 100 can use a machine learning unit of the main body of the guide robot or a connected cloud server.

Figure 8:
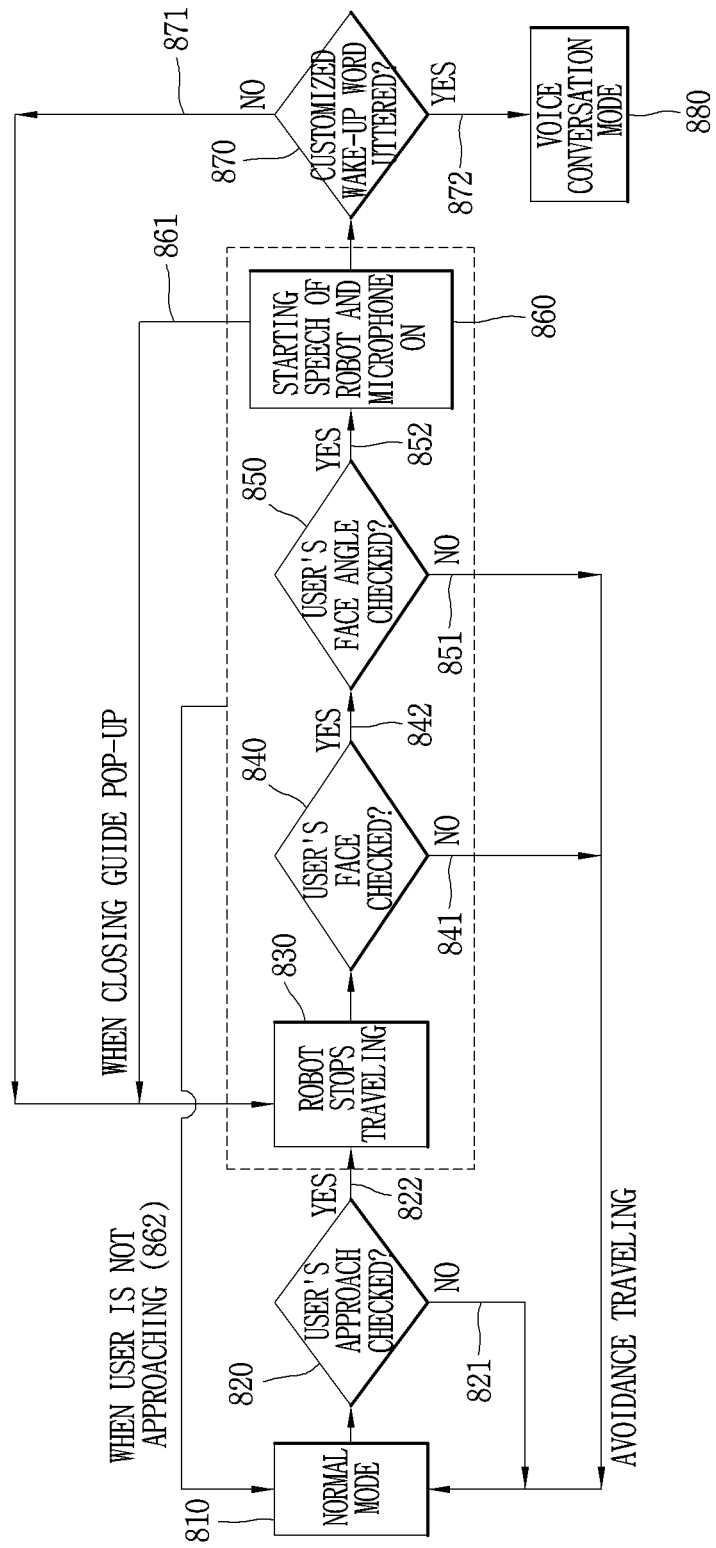
FIG. 8 is a flowchart for explaining various examples related to switching from a guidance mode to a voice conversation (voice talk) mode in a guide robot according to an embodiment of the present disclosure.

FIG. 8 is a flowchart for explaining various examples related to switching from a guidance mode to a voice conversation (talk) mode in the guide robot according to the implementation.

Referring to FIG. 8, the guide robot uses the touch screen of the main body as a digital signage in a normal mode 810, to output information, such as advertisements, news, etc., and perform traveling based on map information.

While traveling in the normal mode, the guide robot continuously checks for a user's approach through a sensor (820). At this time, the user's approach means obstacle detection because the camera is not yet activated (e.g., the camera can be maintained in a deactivated or off state until a user's approach is detected by a sensor). When an obstacle is detected within preset detection ranges of a front side, left and right sides, and a height based on the main body of the guide robot (822), the guide robot stops traveling (830). On the other hand, while only an obstacle outside of the preset detection ranges is detected, the guide robot outputs at least one digital signage and maintains the normal mode 810 in which it travels by itself.

Here, when a place where the guide robot is located is a place where a lot of people pass by or a floating population density is high (e.g., a crowded or busy situation), obstacle detection ranges can be further limited in order to prevent the guide robot from stopping too often. For example, the front detection range based on the main body of the guide robot can change to 0.5 m shorter than 1.0 m.

After the guide robot stops traveling (830), the guide robot activates the camera to check the user's face (840). That is, the guide robot checks through the camera whether an obstacle detected within the preset detection range through the sensor is a person or an object (or animal). Alternatively, the guide robot checks a gaze direction (or face direction) through the camera in order to determine whether to travel by avoiding the approaching user.

When the user's face is recognized (842), the angle of the user's face is checked for a preset period of time (e.g., for 5 seconds) (850). Specifically, the guide robot monitors whether the change in the user's face angle is within a predetermined detection range (e.g., staring at the guide robot within a range of 20 degrees in the left and right direction), to determine that the user intends to use the robot. On the other hand, when it is determined that the user's face is not recognized (841) or when the recognized face angle change is outside of a predetermined detection range, or gazing at the guide robot is not continued for a predetermined threshold time (851), the guide robot determines that the user does not intend to use the robot.

In this situation, the guide robot is switched back to the normal mode 810 after performing avoidance traveling for a predetermined period of time (e.g., about 10 seconds). The avoidance traveling can refer to an operation in which the control unit 180 of the guide robot turns the travel unit 130 by manipulating a drive motor and wheels of the travel unit 130, to move out of an area where the user exists. In this way, the reason for performing the avoidance traveling for the predetermined period of time when it is determined that the user does not intend to use the guide robot is to avoid an error of continuously recognizing the face of the user who does not intend to use the guide robot, detecting the face angle change, and staying in one place for a long time. For example, in this way, the guide robot can avoid staring at one person too long, which some users may find unsettling.

When it is monitored that the change in the face angle is detected only within a predetermined detection range for a predetermined threshold time (e.g., 300 ms) (852), it is determined that the user intends to use the guide robot. Then, the guide robot outputs a starting speech (remark, word) including the usage guide information and turns the microphone on to receive the user's voice (860). In this situation, when sounds related to the digital signage are being output in the normal mode 810, the output of the sounds of the digital signage can be stopped.

In response to the starting speech of the guide robot, it is determined whether the user has uttered the predetermined customized wake-up word through the voice reception module (870). When the customized wake-up word is received through the voice reception module (872), the guide robot starts the voice conversation mode (880). On the other hand, when the customized wake-up word has not been uttered within a predetermined period of time (871), the guide robot returns to the step (830) of stopping the traveling to perform the user face recognition operation again (840).

On the other hand, the starting speech of the guide robot can alternatively be output through the touch screen 151. In this situation, whether to start the voice conversation mode is determined according to a response to the user's touch on the touch screen 151. Specifically, when the user selects a usage guide pop-up output on the touch screen 151, the voice conversation mode 880 is triggered. On the other hand, when the user selects closing ('x') of the usage guide pop-up output on the touch screen 151 (861), the guide robot returns to the step (830) of stopping the traveling to perform the user face recognition operation again (840).

In addition, in one implementation, after the user's approach is confirmed (820), while the guide robot performs the process (860) of outputting the starting speech including the usage guide information, when it is detected through the sensor that the user is no longer approaching (862), the guide robot can output the digital signage and perform a predetermined traveling operation.

As described above, according to the operation of the guide robot of the present disclosure, even for a user who does not know a predetermined wake-up word or a specific gesture matching the wake-up word can perform voice conversation with the guide robot right away without having to learn any specifics or training a head of time. Therefore, the user's intention to speak can be accurately recognized by using sensors and camera disposed in the robot without installation of additional components.

Figure 9:
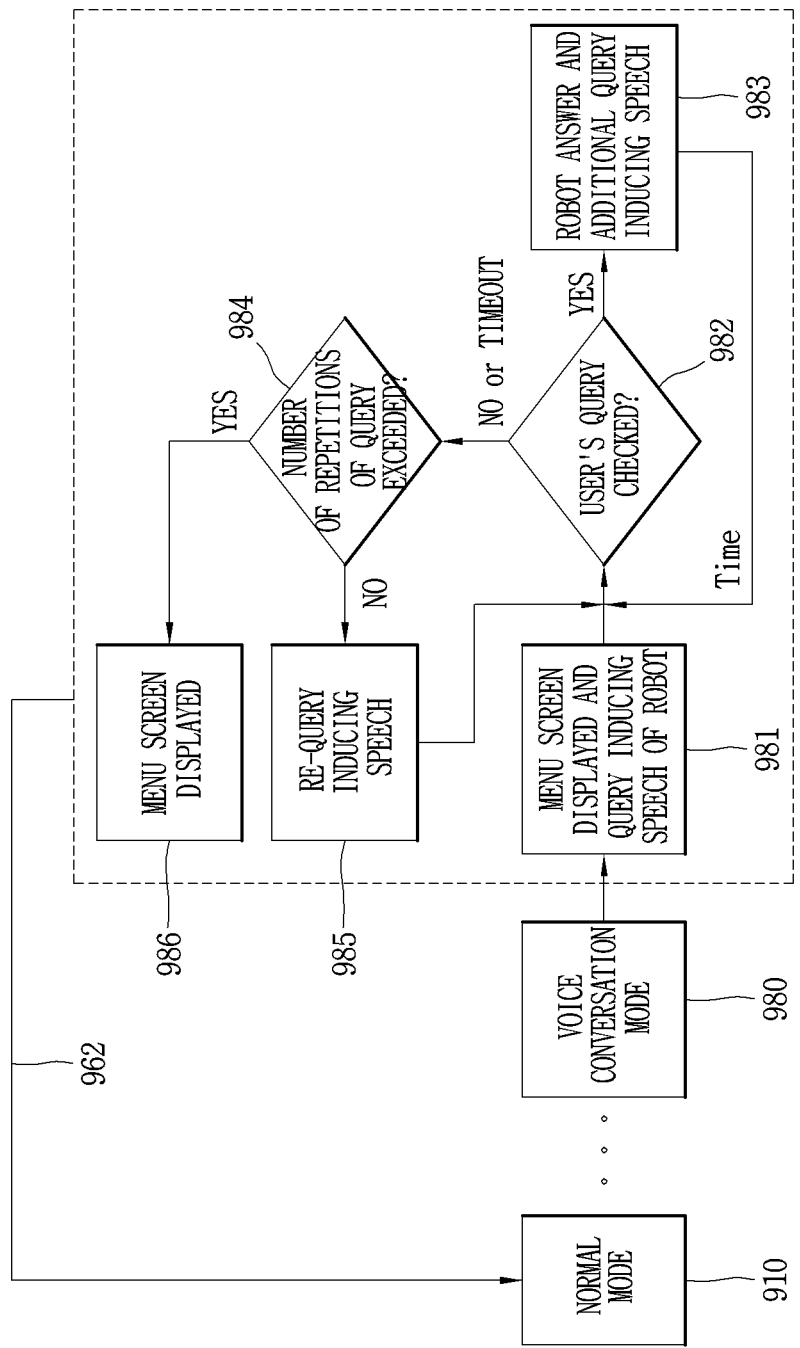
FIG. 9 is a flowchart for explaining an example related to switching from a voice conversation mode to a guide mode in a guide robot according to an embodiment of the present disclosure.

FIG. 9 is a flowchart for explaining an example related to switching from the voice conversation mode to the guide mode in the guide robot according to an implementation.

In FIG. 8, when the guide robot performs the detection of the user's approach (820), the stop of the traveling (830), the recognition of the approached user's face (840), the check of the user's face angle (850), and the output of the starting speech of the robot to provide the usage guide information according to the determination that the user intends to use the robot and the turn-on of the microphone, the guide robot is switched from the normal mode (910) into the voice conversation mode (980) as illustrated in FIG. 9.

In response to the trigger of the voice conversation mode (980), a menu screen can be output on the touch screen 151 of the guide robot and a query inducing speech of the guide robot can be output through the voice output module (e.g., speaker) (981). Thereafter, the guide robot can check the user's query input through the touch screen 151 or the voice reception module (e.g., microphone) (982). When the user's query is input, the guide robot can output an answer and a speech of inducing an additional query through the voice output module (e.g., speaker) (983). At this time, when a predetermined time elapses (time out), the process returns to the step (982) of checking the user's query.

As a result of checking the user's query, when a predetermined time elapses (time out) or the user's query is not input, the guide robot determines whether the user's query exceeds the number of repetitions of the query (984). When exceeding the number of repetitions of the query, the guide robot displays a menu screen on the touch screen 151, otherwise, outputs a re-query inducing speech (985).

As such, while performing the voice conversation mode (980), when the user is not detected any more through the sensor of the guide robot, the guide robot is switched back to the normal mode after a predetermined period of time (e.g., 5 seconds) (910). However, when a predetermined condition is satisfied, the voice conversation mode 980 can be continuously maintained when the user is not detected or regardless of whether the user is detected.

Here, the predetermined condition can indicate a period of time for which a specific function is performed in the guide robot. The specific function can include, for example, a photographing function of the guide robot, a message transmission function, a function of rotating the body/head part in response to a touch input received on a front/rear touch screen, or a standby operation until entering a menu after rotating the body/head part. In addition, when a user's touch input is received on the front/rear touch screen in any of those steps described above, a menu screen can be output on the touch screen (after stopping the output of the digital signage and the traveling of the guide robot).

As described above, in a guide robot according to an implementation and its operating method, even for a user who has no knowledge of a predetermined wake-up word or a specific gesture matching the wake-up word can perform voice conversation without having to learn anything in advance or under go any specific training. In addition, the user's intention to speak can be accurately recognized merely by using sensor and camera disposed on the robot, without additional components. In addition, even after recognizing that the user intends to use the guide robot, a guide voice for inducing the user to utter a customized wake-up word for noise filtering can be output, to minimize a misrecognition, and also various customized wake-up words which are appropriate for situations can be selectively applied without an additional cost for a server.

Further scope of applicability of the present disclosure will become apparent from the following detailed description. It should be understood, however, that the detailed description and specific examples, such as the preferred embodiment of the invention, are given by way of illustration only, since various changes and modifications within the spirit and scope of the invention will be apparent to those skilled in the art.

Features, structures, effects, and the like described in those embodiments are included in at least one embodiment of the present disclosure, and are not necessarily limited to only one embodiment. Furthermore, features, structures, effects, and the like illustrated in each embodiment can be combined or modified with respect to other embodiments by those skilled in the art to which the embodiments belong. Therefore, contents related to such combinations and modifications should be construed as being included in the scope of the present disclosure.

In addition, the foregoing description has been made with reference to the embodiments, but it is merely illustrative and is not intended to limit the present disclosure. It will be apparent that other changes and applications can be made by those skilled in the art to which the present disclosure belong without departing from substantial features of the embodiments of the present disclosure. For example, each component specifically shown in the embodiments can be modified and practiced. And it should be construed that differences relating to such changes and applications are included in the scope of the present disclosure defined in the appended claims.

What is claimed is:

1. A guide robot comprising:
    a travel part configured to move a main body of the guide robot;
    a touch screen disposed on the main body;
    a camera disposed on the main body;
    a sensor configured to detect an approach of a user;
    a voice reception part configured to receive a voice of the user in an activated state; and
    a controller configured to:
        display at least one digital signage on the touch screen while the guide robot is traveling and the camera is in a deactivated state,
        in response to detecting the approach of the user via the sensor, stop the traveling of the guide robot and transition the camera from the deactivated state to an activated state,
        detect a face of the user and a face angle of the user via the camera,
        in response to determining that the user intends to use the guide robot based on the face of the user and the face angle of the user, trigger a voice conversation mode by activating the voice reception part, stopping the display of the at least one digital signage and outputting usage guide information for the voice conversation mode, and
        in response to determining that the user is no longer detected by the sensor, continue displaying the at least one digital signage on the touch screen and traveling the guide robot.

2. The guide robot of claim 1, wherein the usage guide information includes guide information for inducing utterance of a customized wake-up word, and
    wherein the guide information is output through a voice output part disposed on the main body or the touch screen.

3. The guide robot of claim 2, wherein the controller is further configured to:
    in response to receiving the customized wake-up word through the voice reception part, output a voice prompt for inducing a user query from the user through the voice output part.

4. The guide robot of claim 2, wherein the controller is further configured to:
    terminate the voice conversation mode and display the at least one digital signage on the touch screen when the customized wake-up word is not received within a preset period of time.

5. The guide robot of claim 1, wherein the usage guide information includes a preset menu screen.

6. The guide robot of claim 1, wherein the sensor includes at least one of a camera, an ultrasonic sensor, a LiDAR sensor, and a ToF sensor, and
    wherein user detection ranges respectively corresponding to a front side of the main body, a left side of the main body, a right side of the main body, and a height with respect to the main body are preset for the sensor.

7. The guide robot of claim 6, wherein the user detection range corresponding to the height with respect to the main body is set such that a position spaced upward from a bottom surface by a predetermined distance based on the main body is an origin of a user height detection range.

8. The guide robot of claim 6, wherein the controller is configured to reduce a traveling speed of the guide robot, in response detecting the user within a first detection range away from the main body, and
    stop the traveling of the guide robot, in response to detecting the user within in a second detection range closer to the main body than the first detection range.

9. The guide robot of claim 1, wherein the controller is configured to determine that the user intends to use the guide robot when a change of the face angle is maintained within a preset range for a preset period of time.

10. The guide robot of claim 9, wherein the controller is configured to control the travel part to perform avoidance traveling for a preset period of time when recognition of the face of the user through the camera fails or the change of the face angle is not maintained within the preset range for the present period of time.

11. The guide robot of claim 10, wherein the controller is further configured to display the digital signage again on the touch screen when the avoidance traveling is performed.

12. The guide robot of claim 1, wherein the controller is further configured to:
    activate the voice conversation mode based on a touch input receive by the touch screen.

13. A method for operating a guide robot, the method comprising:
    displaying at least one digital signage on a touch screen disposed on a main body of the guide robot while the guide robot is traveling and a camera of the guide robot is in a deactivated state;
    in response to detecting an approach of a user via a sensor in the guide robot, stopping the traveling of the guide robot and transitioning the camera from the deactivated state to an activated state;
    detecting a face of the user and a face angle of the user via the camera;
    in response to determining that the user intends to use the guide robot based on the face of the user and the face angle of the user, triggering a voice conversation mode by activating a voice reception part in the guide robot, stopping the displaying of the at least one digital signage and outputting usage guide information for the voice conversation mode; and
    in response to determining that the user is no longer detected by the sensor, continuing to display the at least one digital signage on the touch screen and travel the guide robot.

14. The method of claim 13, further comprising:
    in response detecting the user within a first distance away from the guide robot, reducing a traveling speed of the guide robot; and in response to detecting the user within a second distance away from the guide robot, the second distance being less than the first distance, stopping the traveling of the guide robot.

15. The method of claim 13, wherein the determining that the user intends to use the guide robot includes:
triggering the voice conversation mode when a change of the face angle is maintained within a preset range for a preset period of time.

16. The method of claim 13, further comprising:
controlling the guide robot to resume traveling when a change of the face angle is not maintained within a preset range for a preset period of time.

17. The method of claim 13, wherein the usage guide information includes a customized wake-up word for activating a function of the guide robot.

* * * * *